C. W. PELTON AND J. P. BARBOUR.
TIRE FILLER AND TESTER.
APPLICATION FILED MAR. 20, 1919.
1,339,041.
Patented May 4, 1920.
2 SHEETS—SHEET 1.
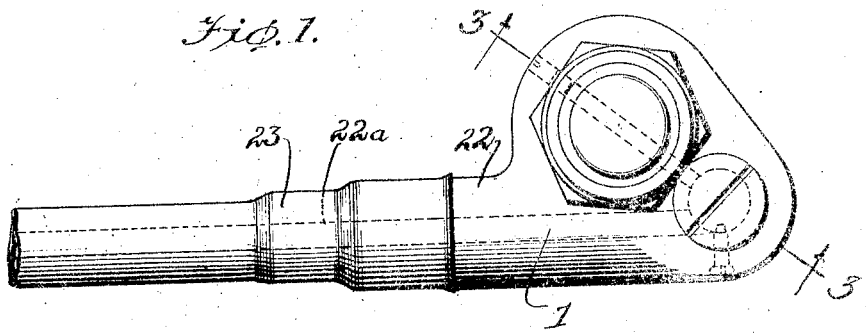
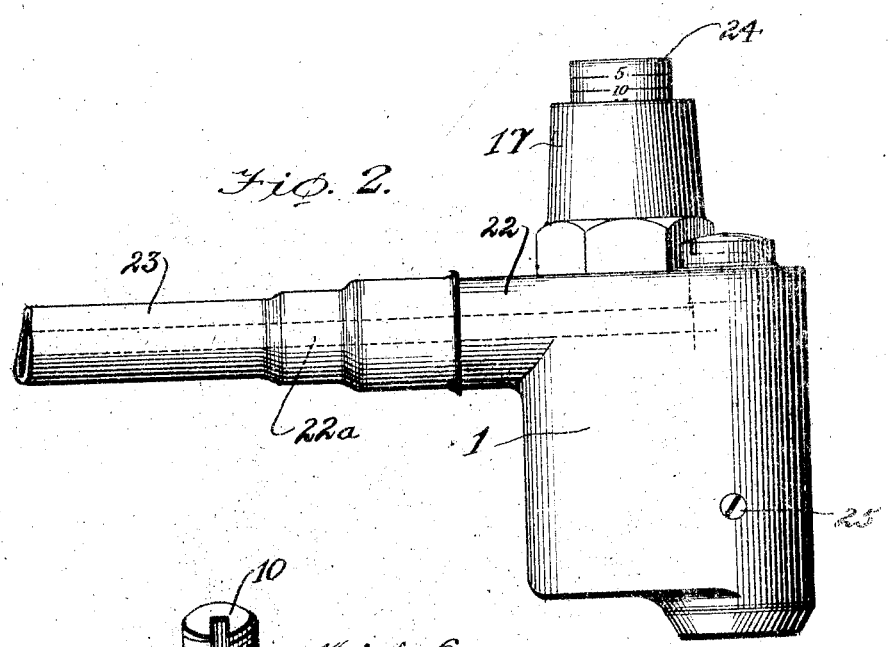
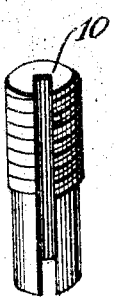
WITNESSES
R. Rousseau.
INVENTOR
C. W. Pelton,
BY J. P. Barbour
ATTORNEYS

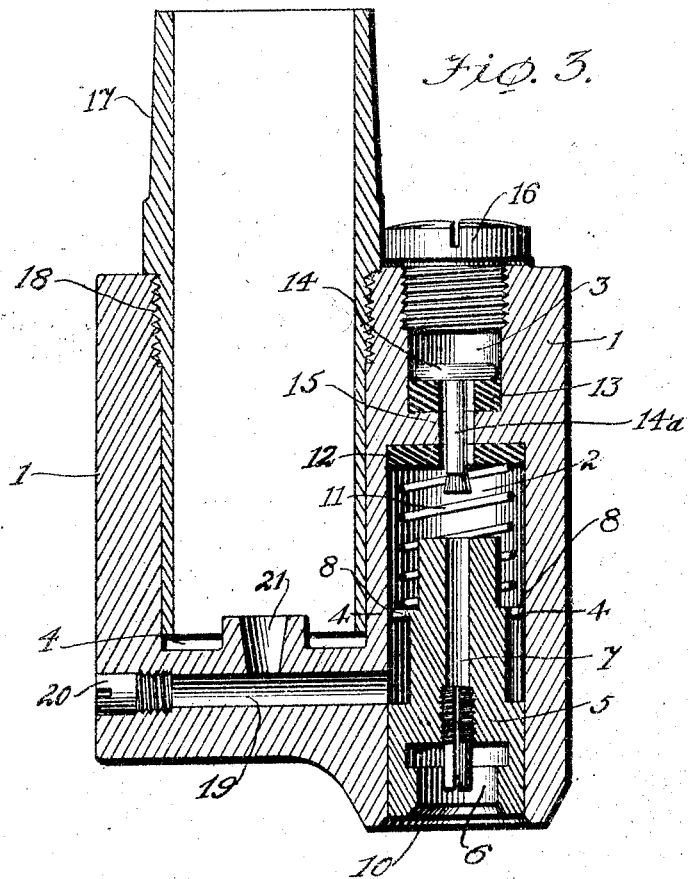
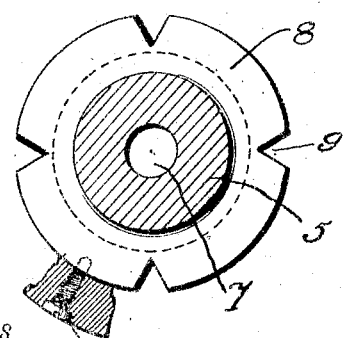
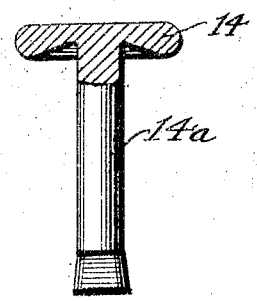

UNITED STATES PATENT OFFICE.

CHARLES WALTER PELTON AND JOHN PORTER BARBOUR, OF LIVINGSTON, MONTANA.

TIRE FILLER AND TESTER.

1,339,041.  Specification of Letters Patent.  Patented May 4, 1920.

Application filed March 20, 1919. Serial No. 283,929.

*To all whom it may concern:*

Be it known that we, CHARLES WALTER PELTON and JOHN PORTER BARBOUR, citizens of the United States, and residents of Livingston, in the county of Park and State of Montana, have invented certain new and useful Improvements in Tire Fillers and Testers, of which the following is a specification.

Our invention relates to devices for filling and testing tires, more particularly automobile tires, and it consists in the combinations, constructions and arrangements herein described and claimed.

An object of our invention is to provide a tire air chuck and gage holder combined in one device which when connected with a source of compressed air will deliver the air into the interior of the tire or will cut off the air from the tire and put the latter in communication with a tire gage so that the pressure within the tire may be readily ascertained, said device being operated by a slight manual movement.

A further object of our invention is to provide a tire filler and tester in which the manual movement which shifts the communication from the tire to the source of compressed air over to the gage and vice versa, is effected by valves which act instantly, thereby reducing the time of operation to a minimum.

A further object of our invention is to provide a device of the type described in which the valve stem of the tire is applied to a single opening of the device and in which communication between the source of compressed air or the gage may be effected at will, while the valve stem is applied at the single opening.

A further object of our invention is to provide a device of the type described which is compact, handy to operate, and relatively simple in construction.

Other objects and advantages will appear in the following specification and the novel features of the invention will be particularly pointed out in the appended claims.

Our invention is illustrated in the accompanying drawings forming part of this application, in which:—

Figure 1 is a plan view of the device,

Fig. 2 is a side elevation,

Fig. 3 is a section along the line 3—3 of Fig. 1, the pressure gage being omitted, Fig. 4 is a section along the line 4—4 of Fig. 3, Fig. 5 is a detail view of one of the valves, a portion being shown in section, and Fig. 6 is a detail view of a stud.

Referring now to the drawings, we have shown therein a device consisting of a main body portion 1 which is preferably made of metal. As will be seen from Fig. 3, the body portion is provided with a bore 2 and a smaller opposed bore 3 in axial alinement therewith and extending in from the opposite side of the body portion. In the normal position of the device, the bore 2 will extend upwardly from the bottom and the bore 3 downwardly from the top. A bore 4 extends downwardly from the top, as shown in Fig. 3.

Disposed within the bore 2 is a valve 5 which is provided at its lower end with a recess 6. The valve 5 has a central channel or passage 7 extending therethrough. The lower part of the valve closely fits the interior of the bore 2, the upper part being reduced and being provided with a flange 8 as seen in Fig. 4, having recesses 9 for the passage of air. A stud 10 has a threaded portion which screws into the body portion of the valve as shown in Fig. 3, this stud having a central channel to permit the passage of air, the lower portion of the stud being adapted to engage the small check valve in the valve stem of a pneumatic tire. In the bore 2 is a spring 11 which bears on the valve 5 in the manner shown at one end, and on a gasket 12 at the other end.

Within the bore 3 is disposed a gasket 13 which forms a seat for the valve 14. The latter is of the shape shown in Fig. 5. It will be noted that the central portion of the valve is slightly undercut to afford a firm seat all around the edges of the valve head. The valve is provided with a stem 14ª which extends through an opening 15 adapted to establish communication between the bores 2 and 3. A screw plug 16 closes the upper end of the bore 3.

The bore 4 is designed to receive a sleeve 17 which is screw threaded at 18 to hold it to the body portion. A bore 19 communicates at one end with the interior of the bore 2, the other end being closed by a screw plug 20. The bore 19 communicates with the interior of the bore 4 by means of a passage 21. The body portion is provided with an integral stem 22 which has a passage 22ª communicating with the bore 3.

From the foregoing description of the various parts of the device, the operation thereof may be readily understood. The stem 22 of the tire tester and filler is connected with any suitable source of compressed air as for instance the tube 23 leading to the source (not shown), and a tire gage 24 (see Fig. 2) such as a Schrader standard tire gage or other gages, is disposed in the sleeve 17. When it is desired to ascertain the pressure within the tire, the device is applied to the valve stem of the tire, the stud 10 opening the check valve and thereby permitting the pressure within the tire to cause the gage to register, this pressure being transmitted through the stud 10, the passage 7, the bore 2, passages 19 and 21, into the interior of the sleeve 17. If the tire needs more inflation, then the body portion is pressed downwardly onto the valve stem. This forces the valve 5 upwardly against the tension of the spring 11. The body portion of the valve 5 closes the passage 19, thus cutting off the gage and the upper end of the valve engages the lower portion of the valve stem 14ª, lifting the valve 14 off of its seat and permitting air from the storage tank which has heretofore been kept back by the valve 14, to pass the valve 14 and to pass through the valve 5 into the interior of the tire. When the body portion 1 is raised the spring 11 will force the valve 5 downwardly, thus swinging the valve 14 and permitting it to seat on the gasket 13 so as to cut off communication between the tire and the source of air. The movement of the valve 5 will again uncover the end of the passage 19 so as to permit the gage to register the pressure. In order to prevent the valve 5 from being forced out of the bore, we provide the screw 25 whose end extends underneath the flange 8 so as to permit the valve to be brought to the position shown in Fig. 3, but no farther. When the device is removed from the valve stem of the tire, the check valve of course closes in the ordinary manner.

We are aware that devices for filling and testing tires are not broadly new, but in the present instance it will be observed that there is only one opening through which the air flows from the body portion of the device into the tire. It is not necessary to remove the device by changing from the gage to the pressure tank. All that is necessary is to use a slight pressure and to relieve the pressure when one can establish communication between either the gage or the pressure tank at will. The device operates accurately and quickly, as well as noiselessly, the gaskets 12 and 13 aiding in rendering the device noiseless, since the gasket 12 cushions the end of the valve 5 when the latter is pushed upwardly, and the gasket 13 provides a noiseless seat for the valve 14.

We claim:—

1. A tire filling and testing device comprising a hollow body portion having an opening adapted to receive the valve stem of a pneumatic tire, a pressure gage carried by the body portion, means for admitting air under pressure to said hollow body portion, and a pair of valves within said body portion for establishing communication between the tire and said gage, or between the tire and source of compressed air, at will, one of said valves being operated by the movement of said body portion relative to said valve stem, and the other valve being operated by a movement of said first named valve.

2. A tire filling and testing device comprising a hollow body portion, a pressure gage communicating therewith, means for connecting said body portion with a source of compressed air, said body portion having an opening arranged to permit the entrance of a portion of the valve stem of a pneumatic tire, means carried by the body portion and acting on an initial movement of the body portion toward the valve stem for establishing communication between the tire and the gage, and means acting on a further movement of the body portion for cutting off the gage and establishing communication between the tire and the source of compressed air.

3. A tire filling and testing device comprising a hollow body portion having a pair of bores, means for admitting compressed air into one of said bores, a valve for normally closing communication between said bores, a spring-pressed valve disposed in one of said bores, a gage, means for normally establishing communication between the gage and the bore containing the spring-pressed valve, an initial movement of said spring-pressed valve against the tension of the spring serving to cut off communication with the gage and a further movement of said spring-pressed valve serving to engage said first named valve for establishing communication between said first named and said second named bores.

4. A tire filling and testing device comprising a body portion having a pair of alined bores, a valve for normally closing communication between said alined bores, means for delivering compressed air into one of said bores, a spring-pressed valve disposed in the other bore, said spring-pressed valve having a passage therethrough, a gage chamber carried by the body portion, means for establishing communication between said gage chamber and the bore containing the spring-pressed valve, a stud carried by the spring-pressed valve for engaging the check valve of a pneumatic tire to open the latter, a movement of the body portion serving to move said spring-pressed valve to close communication with the gage chamber and to bring the valve into partial engagement with the first named valve whereby the latter is opened and communication is established between the two first mentioned bores.

CHARLES WALTER PELTON.
JOHN PORTER BARBOUR.